US011417234B2

(12) United States Patent
Bowman et al.

(10) Patent No.: US 11,417,234 B2
(45) Date of Patent: Aug. 16, 2022

(54) INTERACTIVE MULTISENSORY LEARNING PROCESS AND TUTORIAL DEVICE

(71) Applicant: OgStar Reading, LLC, Owings Mills, MD (US)

(72) Inventors: Fran Levin Bowman, Owings Mills, MD (US); Stephanie Nislow, Owings Mills, MD (US)

(73) Assignee: OgStar Reading, LLC, Owings Mills, MD (US)

( * ) Notice: Subject to any disclaimer, the term of this patent is extended or adjusted under 35 U.S.C. 154(b) by 110 days.

(21) Appl. No.: 15/593,105

(22) Filed: May 11, 2017

(65) Prior Publication Data

US 2017/0330479 A1    Nov. 16, 2017

Related U.S. Application Data

(60) Provisional application No. 62/334,486, filed on May 11, 2016.

(51) Int. Cl.
*G09B 17/00* (2006.01)
*G10L 15/26* (2006.01)
(Continued)

(52) U.S. Cl.
CPC ......... *G09B 17/006* (2013.01); *G06F 40/279* (2020.01); *G09B 5/06* (2013.01); (Continued)

(58) Field of Classification Search
None
See application file for complete search history.

(56) References Cited

U.S. PATENT DOCUMENTS 4,468,204 A * 8/1984 Scott ................... G10L 15/07
                                                 434/309
5,219,291 A * 6/1993 Fong ..................... G09B 5/065
                                                 434/169
(Continued)

FOREIGN PATENT DOCUMENTS

WO   WO-2006064295 A2 *  6/2006  ........... G09B 17/003
WO   WO-2012152290 A1 * 11/2012  ............... G09B 5/04
(Continued)

OTHER PUBLICATIONS

Birch; "Multisensory Teaching of Basic Language Skills"; p. 277-287; 2005; http://archive.brookespublishing.com/newsletters/downloads/Birsh_SOS.pdf (Year: 2005).*

*Primary Examiner* — Jason T Yen
(74) *Attorney, Agent, or Firm* — The Webb Law Firm

(57) ABSTRACT

Disclosed is a computer-based multisensory tutorial that collects vocal data and tactile input data from a user related to a target presented by a GUI, the target comprising a phoneme, grapheme, letter, word; determines if the collected data exceeds or fails to meet a threshold value associated with the target; and provides a correction prompt visible or audible to a user if the input does not meet the threshold. A typical user of the tutorial may be a student (child or adult) in an educational setting, but use is not intended to be limited thereto. The multisensory tutorial may be configured for a plurality of languages. A multisensory tutorial configured device comprises one or more tutorial software modules, a GUI lesson screen, and a plurality of integrated lessons based on an Ortin-Gillingham plus program (for example one chosen between lessons 20 and 50), but is not limited thereto.

18 Claims, 8 Drawing Sheets

(51) Int. Cl.
*G09B 19/04* (2006.01)
*G06F 40/279* (2020.01)
*G09B 5/06* (2006.01)
*G09B 5/12* (2006.01)
*G09B 7/04* (2006.01)
*G10L 15/187* (2013.01)
*G10L 15/22* (2006.01)
*G06F 3/04883* (2022.01)
*G06F 3/16* (2006.01)

(52) U.S. Cl.
CPC ............ *G09B 5/125* (2013.01); *G09B 7/04* (2013.01); *G09B 19/04* (2013.01); *G10L 15/187* (2013.01); *G10L 15/22* (2013.01); *G10L 15/26* (2013.01); *G06F 3/04883* (2013.01); *G06F 3/167* (2013.01)

(56) References Cited

U.S. PATENT DOCUMENTS

| | | | | |
|---|---|---|---|---|
| 5,302,132 A * | 4/1994 | Corder | G09B 5/14 | 345/173 |
| 5,429,513 A * | 7/1995 | Diaz-Plaza | G09B 1/00 | 273/302 |
| 5,692,906 A * | 12/1997 | Corder | G06Q 20/042 | 434/118 |
| 5,745,911 A * | 4/1998 | Sugiyama | G06F 40/232 | 715/236 |
| 5,768,420 A | 6/1998 | Brown et al. | | |
| 5,875,256 A | 2/1999 | Brown et al. | | |
| 6,215,901 B1 * | 4/2001 | Schwartz | G06K 9/222 | 382/186 |
| 6,339,655 B1 | 1/2002 | Aharonson et al. | | |
| 6,468,084 B1 * | 10/2002 | MacMillan | G09B 5/04 | 434/156 |
| 6,504,545 B1 * | 1/2003 | Browne | G06F 17/214 | 345/473 |
| 6,535,853 B1 * | 3/2003 | Reitano | G10L 17/26 | 434/156 |
| 6,542,866 B1 | 4/2003 | Jiang et al. | | |
| 6,669,478 B2 * | 12/2003 | Edwards | G09B 5/06 | 434/159 |
| 7,270,546 B1 * | 9/2007 | Adams, Jr | G09B 7/04 | 434/178 |
| 7,302,099 B2 | 11/2007 | Zhang et al. | | |
| 8,092,223 B1 * | 1/2012 | Sharp | G09B 11/04 | 434/162 |
| 8,116,569 B2 | 2/2012 | Markiewicz et al. | | |
| 8,777,626 B2 * | 7/2014 | Levy | G09B 17/003 | 434/167 |
| 8,944,824 B2 * | 2/2015 | Marggraff | G09B 11/00 | 345/169 |
| 9,955,286 B2 * | 4/2018 | Segal | G06F 9/5088 | |
| 9,996,255 B2 * | 6/2018 | Rav-Noy | G06F 3/04883 | |
| 2002/0076684 A1 * | 6/2002 | Blevins | G09B 7/02 | 434/322 |
| 2002/0090596 A1 * | 7/2002 | Sosoka | G09B 17/006 | 434/167 |
| 2002/0115044 A1 * | 8/2002 | Shpiro | G09B 19/06 | 434/156 |
| 2002/0158850 A1 * | 10/2002 | Sun | G09B 19/04 | 345/173 |
| 2002/0160342 A1 * | 10/2002 | Castro | G09B 5/062 | 434/159 |
| 2003/0099920 A1 * | 5/2003 | Edwards | G09B 5/06 | 434/159 |
| 2003/0134257 A1 * | 7/2003 | Morsy | G09B 7/00 | 434/169 |
| 2004/0058304 A1 * | 3/2004 | Morsy | G09B 7/00 | 434/262 |
| 2005/0064375 A1 * | 3/2005 | Blank | G09B 17/003 | 434/178 |
| 2005/0084829 A1 * | 4/2005 | Peters | G09B 7/00 | 434/157 |
| 2005/0106538 A1 * | 5/2005 | Freeman | G09B 5/02 | 434/167 |
| 2005/0266386 A1 * | 12/2005 | Marggraff | G09B 5/062 | 434/317 |
| 2006/0040242 A1 * | 2/2006 | Mejia | G09B 1/00 | 434/170 |
| 2006/0183099 A1 * | 8/2006 | Feely | G09B 7/02 | 434/323 |
| 2007/0160971 A1 * | 7/2007 | Caldera | G09B 7/00 | 434/353 |
| 2007/0288411 A1 * | 12/2007 | Jenkins | G09B 7/02 | 706/45 |
| 2008/0048991 A1 * | 2/2008 | Freeman | G09B 5/02 | 345/173 |
| 2008/0206724 A1 * | 8/2008 | Volden | G09B 17/00 | 434/178 |
| 2009/0081623 A1 * | 3/2009 | Parkinson | G09B 7/00 | 434/169 |
| 2009/0305208 A1 * | 12/2009 | Stewart | G09B 11/00 | 434/258 |
| 2010/0003659 A1 * | 1/2010 | Edmonds | G09B 5/062 | 434/350 |
| 2011/0065082 A1 * | 3/2011 | Gal | G09B 7/02 | 434/365 |
| 2013/0017527 A1 * | 1/2013 | Nguyen | G06Q 30/0224 | 434/362 |
| 2013/0295535 A1 * | 11/2013 | Levy | G09B 17/006 | 434/169 |
| 2014/0113258 A1 * | 4/2014 | DeGoede | A61B 5/11 | 434/155 |
| 2014/0234809 A1 * | 8/2014 | Colvard | G09B 17/006 | 434/169 |
| 2014/0248590 A1 * | 9/2014 | McCormick | G09B 5/06 | 434/157 |
| 2015/0012812 A1 * | 1/2015 | Wu | G06T 11/60 | 715/234 |
| 2015/0104764 A1 * | 4/2015 | Murray | G09B 7/08 | 434/169 |
| 2015/0143221 A1 * | 5/2015 | Ahuja | H04L 9/32 | 715/230 |
| 2015/0261429 A1 * | 9/2015 | Ghassabian | G06F 3/0482 | 715/773 |
| 2016/0260345 A1 * | 9/2016 | Milan | G09B 17/00 | |
| 2017/0148341 A1 * | 5/2017 | Boulton | G09B 5/02 | |
| 2017/0249015 A1 * | 8/2017 | Kang | G06F 3/005 | |
| 2018/0033335 A1 * | 2/2018 | Hancock | G09B 19/04 | |
| 2018/0107818 A1 * | 4/2018 | Wu | G06F 40/171 | |
| 2019/0259296 A1 * | 8/2019 | De La Rosa | G09B 5/06 | |
| 2019/0347948 A1 * | 11/2019 | Gill | G09B 5/065 | |
| 2020/0258417 A1 * | 8/2020 | Mallin | G06F 9/451 | |

FOREIGN PATENT DOCUMENTS

| | | | | |
|---|---|---|---|---|
| WO | WO-2014006198 A1 * | 1/2014 | ............ | G09B 11/00 |
| WO | 2016053320 A1 | 4/2016 | | |

* cited by examiner

INTERACTIVE MULTISENSORY LEARNING PROCESS AND TUTORIAL DEVICE

CROSS-REFERENCE TO RELATED APPLICATIONS

This Application claims priority to U.S. Provisional Patent Application No. 62/334,486, filed on May 11, 2016, the content of which is hereby incorporated in its entirety.

BACKGROUND

Existing technology either allows a user to orally input a phoneme(s), words, or sentences into the microphone of a mobile device or to provide touch input of a grapheme(s), words, or sentences onto the touchscreen of the same device, but no technology presently receives spoken and written input simultaneously, with subsequent analysis that provides simultaneously feedback as to the accuracy with which the user's pronunciation of phoneme(s), words, and sentences and writing of grapheme(s), words, and sentences match the program's target sounds and letter formations.

SUMMARY OF THE INVENTION

The present invention provides a system and method for multisensory analysis and feedback of written and spoken sounds, text, words (Or combinations thereof) using a portable electronic device configured with a multisensory analytics module.

The present invention is designed to teach reading, writing, and spelling to Dyslexics, English language learners, and students with learning disabilities or difficulties. The invention is language agnostic, and may employ one or more of multiple languages, even though the present disclosure is focused on the English language, other languages are envisioned. The present invention allows a user to simultaneously say phoneme(s), words, and sentences into the microphone of a portable electronic device, such as a tablet, iPad, smartphone, or other portable device, while writing corresponding grapheme(s), words, and sentences (with capitalization and punctuation) onto the touchscreen of the same device; the system in turn analyses the input and provides feedback and correction in order to guide a learner to correct speech or reading.

The present invention comprises, in part, a tutorial module configured as a mobile application, to analyze the accuracy of both the said phoneme(s), words, and sentences, and the written grapheme(s), words, and sentences and provide simultaneously auditory and/or visual feedback to the user based on whether or not the user's pronunciation and/or writing match the program's target sounds and letter formations satisfactorily. Upon satisfactory completion of the task, the user is prompted to progress to the next task. Upon unsatisfactory completion of the task, the application will alert the user and model the correct oral and/or touch input with variable levels of voice over and visual support.

In one aspect, a method is provided, the method comprising presenting, via a portable electronic device configured with a multisensory tutorial module, a task to a user, wherein the task is presented as an oral command and a visual command; receiving, via a microphone of the portable electronic device, a vocal input comprising one or more of a phoneme, word, or sentence from a user, while receiving, via an input on the portable electronic device, a tactile input comprising input corresponding to one or more of a written grapheme, wherein the vocal and tactile input are received essentially simultaneously on the portable electronic device; analyzing, via an analytics module of the multisensory tutorial module, the accuracy of the combination of the vocal input and the tactile input against a pre-programmed target sound and text formation data; based on accuracy of the analysis, progressing to a next task; based on inaccuracy, alerting the user and presenting a model for correcting an inaccuracy, wherein the model comprises one or both of a correct oral pronunciation and or visual instructions for correct tactile input, thereby providing a multisensory tutorial for one or both of proper pronunciation or proper text formation.

In another aspect, also provided is a non-transitory computer-readable medium having recorded thereon a program that causes a portable device to execute a method, comprising presenting, via a portable electronic device configured with a multisensory tutorial module, a task to a user, wherein the task is presented as an oral command and a visual command; receiving, via a microphone of the portable electronic device, a vocal input comprising one or more of a phoneme, word, or sentence from a user, while receiving, via an input on the portable electronic device, a tactile input comprising one or more of a written grapheme, wherein the vocal and tactile input are received essentially simultaneously on the portable electronic device; analyzing, via an analytics module of the multisensory tutorial module, the accuracy of the combination of the vocal input and the tactile input against a pre-programmed target sound and text formation data; based on accuracy of the analysis, progressing to a next task; based on inaccuracy, alerting the user and presenting a model for correcting an inaccuracy, wherein the model comprises one or both of a correct oral pronunciation and or visual instructions for correct textual input, thereby providing a multisensory tutorial for one or both of proper pronunciation or proper text formation.

In another aspect a system is provided, the system comprising at least one tutorial database, wherein the database is in communication with a portable electronic device configured with a display; input means; a microphone; one or more speakers; a processor; and a multisensory tutorial module. In yet another aspect, a computer-implemented system is provided comprising a portable electronic device configured with a visual display, a tactile input device for receiving manual user input, and a microphone for receiving oral user input; and tutorial module comprising one or more of a first, second, and third, successive evaluation sub-modules comprising programming executable on a processor operatively associated with the portable electronic device; the first sub-module comprising a trace-and-say module, the trace-and-say module comprising first display programming to display characters for oral pronunciation and manual tracing by the user, a trace recognition engine for receiving and processing the input from the tactile input device to determine success or failure of the manual tracing, and microphone programming for detecting oral pronunciation of the displayed characters; the second sub-module comprising a write-and-say module, the write-and-say module comprising programming to display an input field to receive manual character input, a character recognition engine for receiving and processing the manual character input to determine success or failure of the manual character input, and the microphone programming; and the third sub-module comprising a pronunciation module comprising the microphone programming and a speech recognition engine for receiving and processing oral input of the user to determine success or failure of pronouncing the characters; wherein the system includes success-failure programming to at least partially re-execute programming of respective modules in response to the respective modules determining a failure, and to execute a successive one of the three modules in response to determining a success in the first or the second modules.

Also provided is a computer-implemented tutoring process, comprising: displaying one or more computer-generated characters on a graphical user interface of a portable electronic device configured with a multisensory tutorial module; receiving a first manual input corresponding to a user's attempted tracing the characters; receiving a first vocal input from the user corresponding to the displayed characters; processing the first manual input from the user to determine a degree of correspondence between the first manual input and the characters; comparing the degree of correspondence with predetermined correspondence thresholds to determine success or failure of the user's attempted tracing of the characters; in response to a determination of failure, repeating the step of receiving the first manual input; in response to a determination of success, performing the following steps: displaying a computer-generated character input field; receiving second manual input corresponding to a user's attempted writing of the characters previously displayed; receiving second vocal input corresponding to the user's attempted writing of the characters; processing the second manual input to determine a degree of correspondence between the second manual input and the characters previously displayed; comparing the degree of correspondence determined with predetermined correspondence thresholds to determine success or failure of the user's attempted writing of the characters; in response to a determination of failure, performing at least one of the following steps: repeating the step of receiving the second manual input; and presenting a visual or audible hint to the user; in response to a determination of success, performing the following steps: receiving third vocal input corresponding to the characters previously written by the user; processing the third vocal input to determine a degree of correspondence between data corresponding to the third vocal input and data corresponding to a correct pronunciation of the characters previously written by the user; comparing the degree of correspondence with predetermined correspondence thresholds to determine success or failure of the user's third vocal input; in response to a determination of failure, presenting a visual or audible hint to the user.

The present invention provides multisensory learning, which improves long-term retention in learning. Because the application of the present invention will immediately analyze errors and model correct inputs, the user will be able to independently learn to read, write, and spell. Existing apps that provide feedback on the user's oral pronunciation of phonemes and assess the user's accuracy against the program's target sounds do not do so with a degree of accuracy needed to serve as a tool for self-correction, leading to mastery of desired reading, writing, and spelling skills.

DETAILED DESCRIPTION OF THE INVENTION

Figure 1:
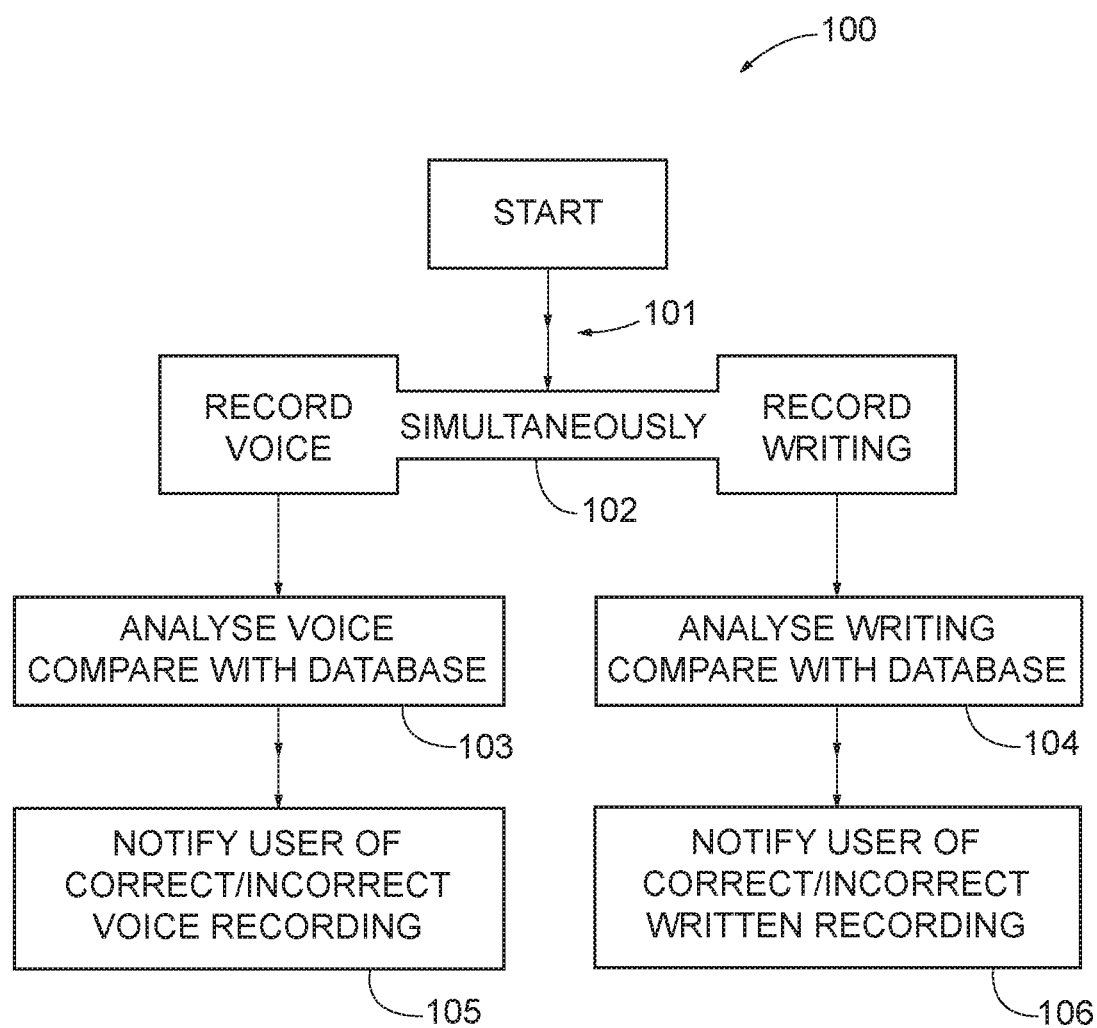
FIG. 1 shows an overview of a process according to one embodiment of the present invention.

Described herein is a technology-based learning process and teaching aid comprising a computer-based multisensory tutorial that analyzes collected vocal data and tactile input data from a user related to a target, the target comprising a phoneme, grapheme, letter, word, phrase, and determines if the collected data matches, exceeds or fails to meet a threshold value associated with the target, and—if necessary—provide a correction prompt visible or audible to a user. In one embodiment, the system and method of the tutorial include the actions of: presenting a target word, letter, grapheme or phoneme on a display screen or touchscreen of a portable electronic device configured with a multisensory tutorial module, receiving tactile input data indicating that a region of the target has been traced by hand or touch device, calculating an accuracy value of the input data against the target; simultaneously receiving vocal input data via the device microphone or a pronunciation of the target, essentially simultaneously with the input of the tactile data; and processing tactile input data and vocal input data via a speech recognition engine and handwriting recognition engine; and providing a correction process and visual indication to provide a correction of tactile input or vocal input that fails to meet a threshold level as compared to the target. Other embodiments of the invention include a system, device, and computer programs, and modules configured to perform the actions of the methods, encoded on computer storage devices. A typical user of the tutorial may be a child or student (child or adult) in an educational setting, but use is not intended to be limited thereto.

The present invention requires a portable electronic device, such as a portable computer (laptop), a mobile tablet computer or smartphone, configured with touchscreen capability and a microphone for receiving user inputs, and at least one speaker; the portable electronic device configured with one or more multisensory tutorial modules and one or more modules configured for voice recognition and input via the touchscreen. The present invention operates within a computer network environment comprised of one or more servers, a computer or other portable electronic device, such as a smartphone, tablet or laptop computer, and their operating systems, one or more modules, sub modules comprising a software program of instructions for carrying out the processes described herein, and access via a wireless communications network between one or more servers and the device.

In one embodiment, a multisensory tutorial method and system of the present invention comprises one or more sub-modules, the sub-modules comprising:

1) Module 1 configured to display a grapheme, letter, word (or words) from an internal database structure located on a server via a content management system;

2) Module 2 and 3 configured to record a singular user's input via voice and touch, respectively, allowing the user to speak the word and "write" the word, simultaneously;

3) Module 4 configured to analyze the vocal/phonic input from the user to determine if it matches what was displayed in module 1, then display a correct/incorrect result. In one embodiment, voice recognition comparisons are done on the local device, but may also be performed remotely, on a server to store all the variables.

4) Module 5 configured to analyze the tactile input to determine if it matches what was displayed in module 1, then display a correct/incorrect result. In one embodiment, all tactile recognition comparisons are done on the local device, but may also be performed remotely on a server to store all the variables.

5) Module 6 configured for tabulation of an accuracy score.

The sub-modules are described numerically for convenience and illustrative purposes only, they are not necessarily listed in sequence. The sub-module list is illustrative and not intended to be exhaustive. In one embodiment, certain functionality may be combined in a single module—for example: the steps performed by Modules 2 and 3 could be combined within one module.

In one embodiment, an multisensory tutorial system comprises a platform, such as an iOS or android operating system, configured with one or more tutorial modules, a lesson screen, and integrated lesson based on Ortin-Gillingham plus program (for example one chosen between lessons 20 and 50). The lesson may be structured by way of interactive "Steps", such as the following hierarchy: a Yellow Step (with each step comprising a game design, interaction template, content, interactivity); Blue Step; Grey Step; Green Step; White Step; Purple Step, etc.

The system is configured with one or more screens for user-interaction, comprising: a welcome screen where a user submits credentials related to a user account or to begin a lesson; a dashboard lessons section from which to view progress and access a user backpack; a lesson screen for initiating a lesson related to a selected topic, game and/or step; and a finish screen that presents a user with a summary of their lesson and/or awards for accomplishments.

In one embodiment, the lesson screen is configured for interaction and navigation. In one illustrative embodiment, a lesson screen utilizes a 7 Wonders Map, which is an illustrated scrolling map themed with the natural wonders of the world. Each wonder area connects with a lesson path, which follows a progression through the overall learning tutorial program. The lesson path is a series of over one hundred lessons that snake through the Wonders Map. When one lesson is completed, the next lesson waypoint opens with an animated effect. One or more avatars, symbols, and/or characters animate from one lesson to the next. As users complete lessons they may accumulate awards, such as stars.

The following example is illustrative of the system and method of the present invention, and is not meant in any way to be exhaustive of configurations, steps, and or specific learning goals. The exemplary phonemes and graphemes, words, sentences, voice-over script, and graphics presented are subject to change. The example is a representative experience for a user, when engaged with the system. The example describes a few illustrative scenarios—by what a user would see and hear on a portable device configured with the multisensory tutorial module. Imagery, text, words, and the like are presented to the user by way of the display of the portable device; the user interacts with the system using a graphical user interface comprising an input (touchscreen input on a portable device, or a stylus, and in additional a microphone) associated with the portable device.

EXAMPLE

Using a portable device configured with a multisensory tutorial module, a user engages with the system of the present invention via a GUI, as illustrated:

1. A challenge word is presented: Student sees the challenge (irregular) word (setting Mt. Everest). The student hears the word "was" pronounced and is instructed to trace over the challenge word while simultaneously saying and writing it three times in a row. The challenge word then disappears and the student is instructed to write the challenge word from memory while saying it at the same time. If correct, the student hears a response e.g., "You did it!" If the student's input is incorrect, then the student is offered feedback—the system provides visual and audio assistance. On the screen is shown and via the speakers is heard the challenge word again, with an instruction as to how to trace/say the word again.

2. Student sees a large, lower case letter "c" and hears the following: "This letter makes the sound /c/." (hard c as in cat) "Say the sound and trace the letters the SAME time." Student traces while saying /c/, and if correct in both saying and tracing, hears, "Great, now say it and copy it here." Student sees box next to letter within which to trace while saying. If correct, student sees letters disappear in a fun way (and a new empty box appears) and hears: "Now write the letter from memory while saying its sound." If the student traces, copies, or writes from memory with a significant margin of error on any step, she sees a pencil icon suggesting a redo. If the redo is incorrect, then the path is modelled with a dashed line. If the student says the sound incorrectly at any point, then a mouth icon appears and she hears, "Say /C/ while writing again." Student may see one icon or both, depending on errors made. When done, student hears, "Fantastic!"

3. Student hears, "Listen to some words with the sound /c/. Then write each word, while saying it at the same time like this . . . " Student sees modeling of saying and writing "cab" in a box on screen. Student hears, "Now you try. Say and write the word "cat" at the same time." Student says/ writes. Error correction mimics previous steps. Student hears, "Say and write the word "cat". Student hears praise when done.

Turning now to the Figures, where shown in FIG. 1 is an overview of a multisensory learning and tutorial process 100 according to one embodiment of the invention, comprising: in response to a prompt (shown at step 101), wherein the prompt is one or more of a letter, word, phoneme or grapheme, on a portable electronic device configured with a microphone and touchscreen for receiving both vocal (voice recording via microphone) and tactile input (via touchscreen input) simultaneously from a singular user, collecting both vocal input data and tactile input data from the singular user, recorded simultaneously (tactile input and vocal input) on the portable electronic device occurs (at step 102); analyzing the collected vocal input recording and the tactile data recording against a database configured with corresponding data associated with the prompt (at steps 102 and 103), and providing one or both of audio and visual feedback via the portable electronic device, thereby notifying the user of a correct or incorrect response (shown at steps 105 and 106), wherein an incorrect response corresponds to vocal or tactile input data that fails to meet at threshold value associated with the prompt, and wherein the process provides one or both of an audio or visual feedback tutorial to the user, based on the user score in one or both of an audio or a tactile measurement to target, in order to correct an error and achieve a correct response.

Figure 2A:
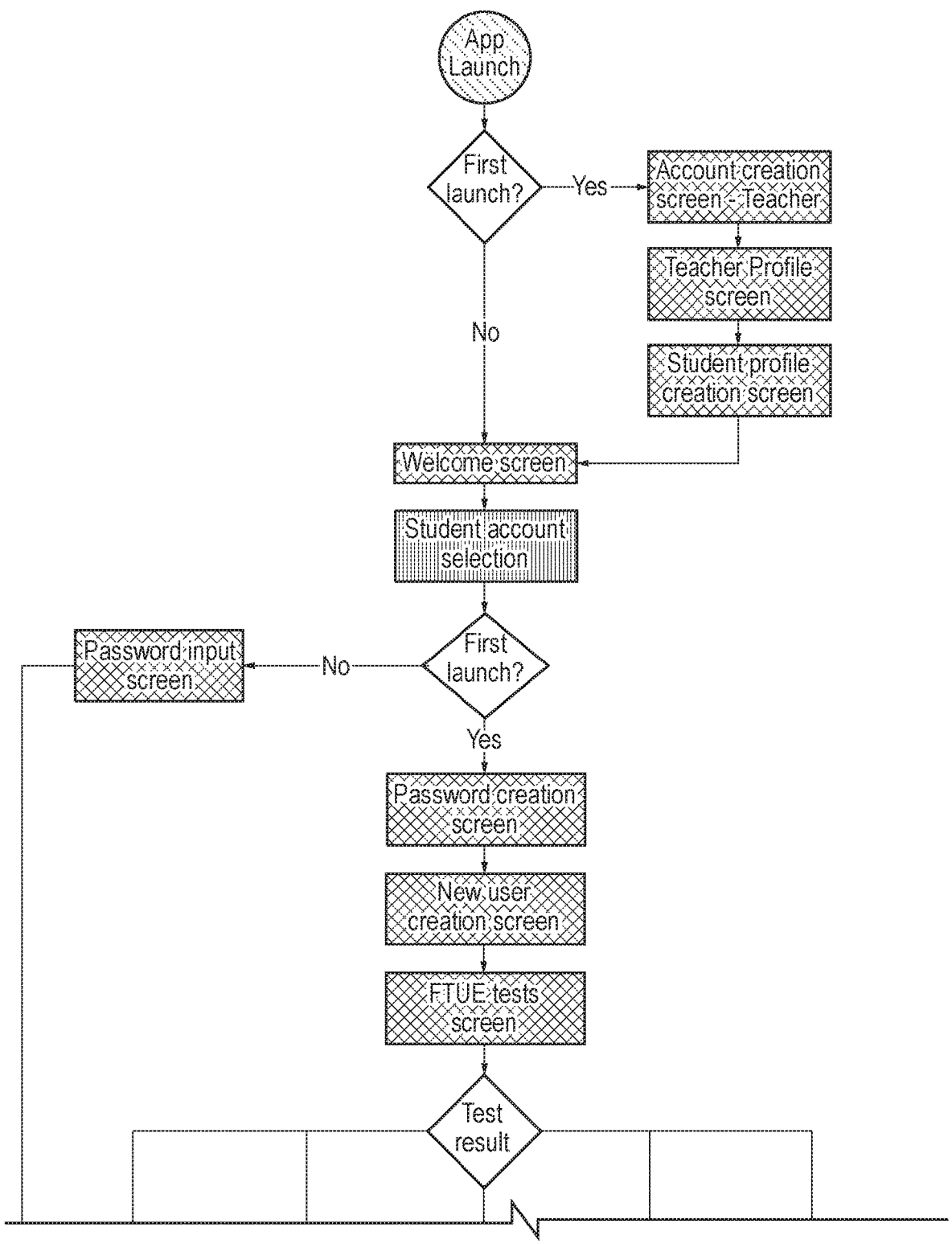
FIG. 2 shows an overview of a system and process according to one embodiment of the present invention.
Figure 2B:
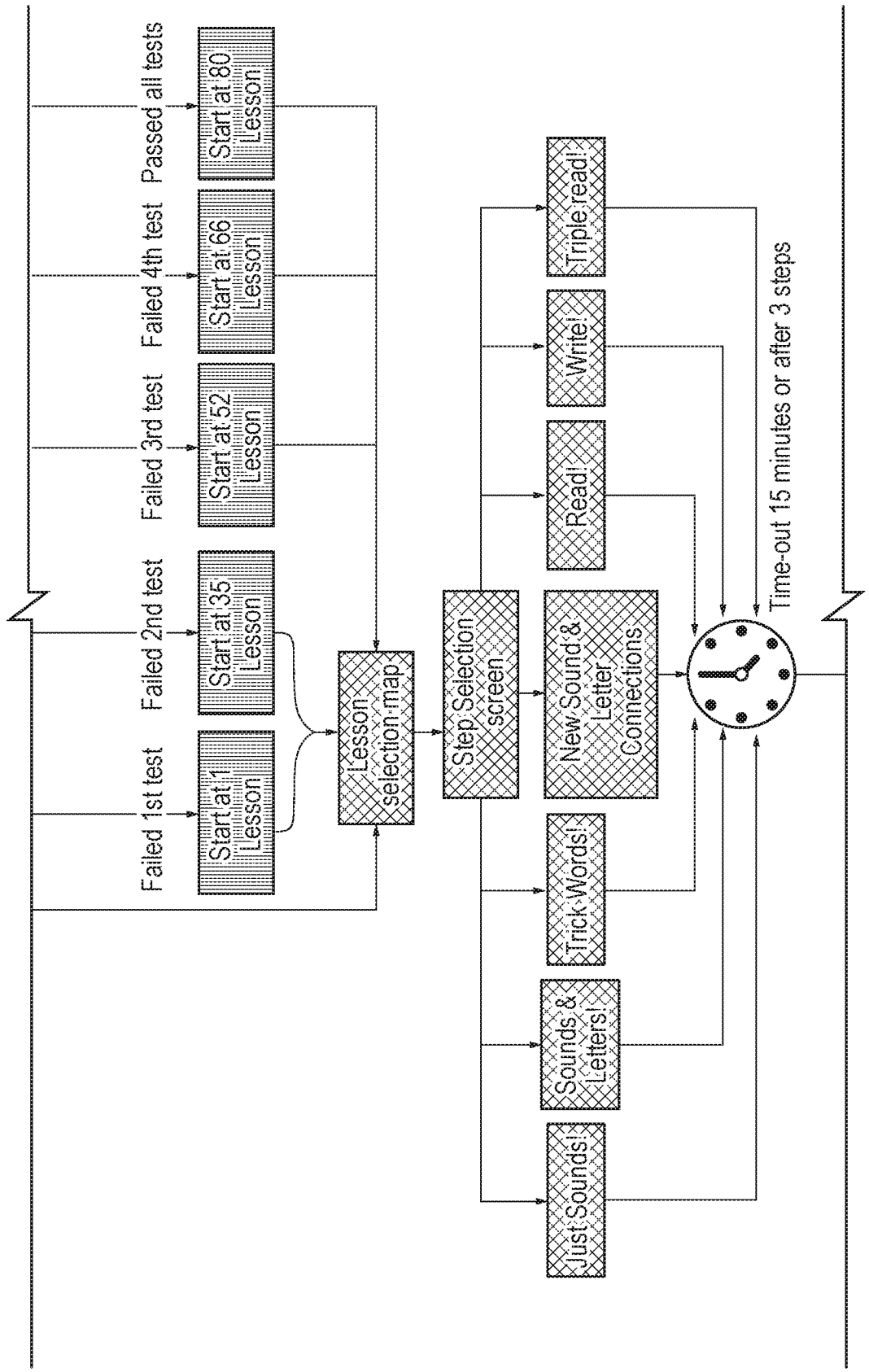
Figure 2C:
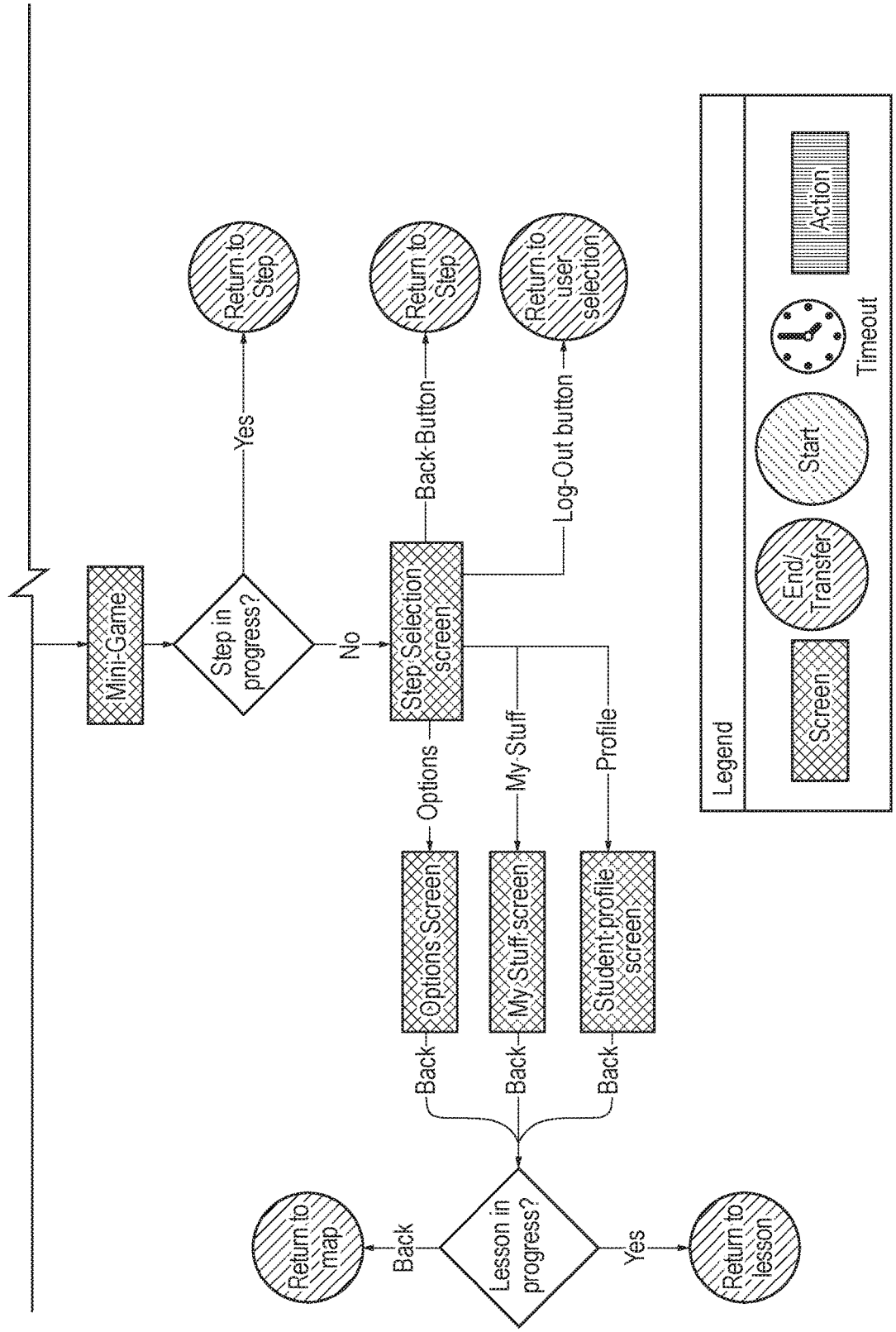

FIG. 2 shows an overview of a system and process according to one embodiment of the present invention, wherein a user—in this example a student—creates an account, creates a password and begins a series of test screens (shown in FIG. 2A). The student engages in a variety of lessons based on test scores and/or success at test attempts; the student then selects from one of several activities on a menu, such as sounds, letters, trick words, reading, writing, and new sounds and letter connections (shown in FIG. 2B). The system is configured to advance according to student success, or to time out bases on user activity or inactivity, as shown in FIG. 2C.

Figure 3A:
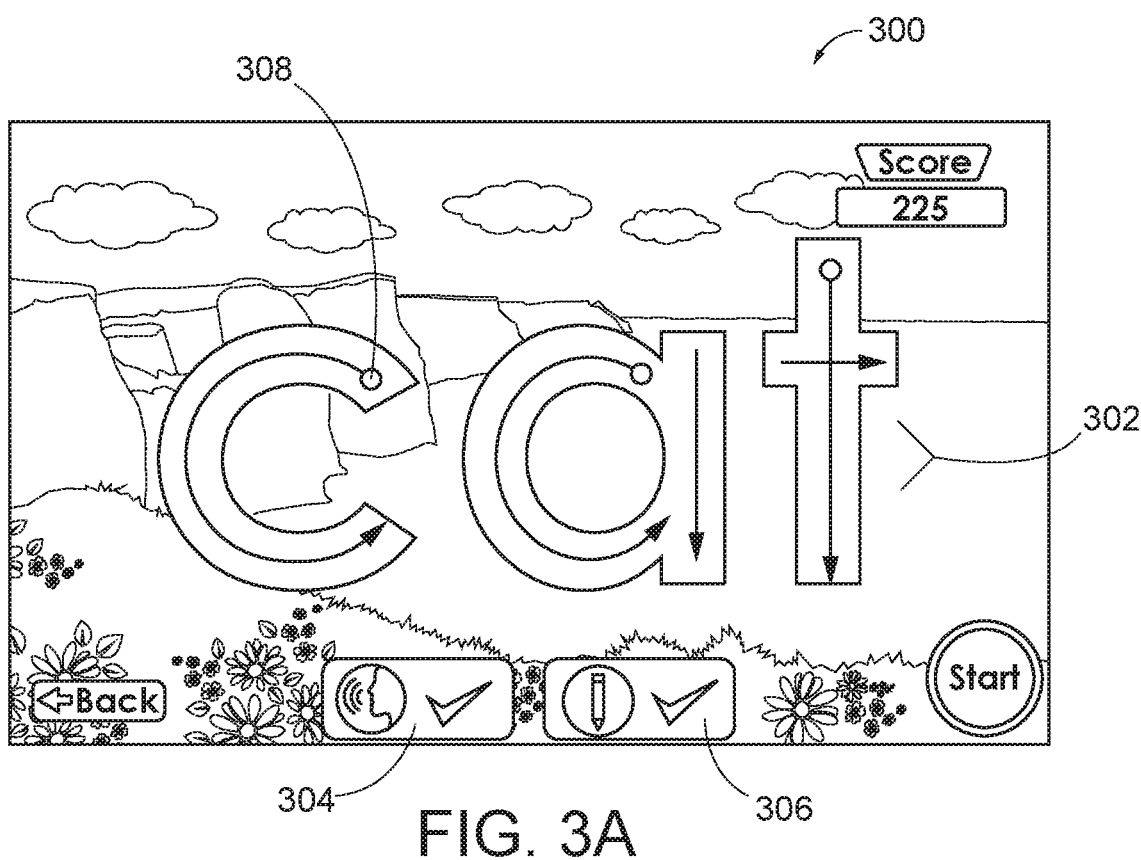
FIG. 3 shows a screen shot of a display on a device configured with a multisensory tutorial module according to one embodiment of the present invention.
Figure 3B:
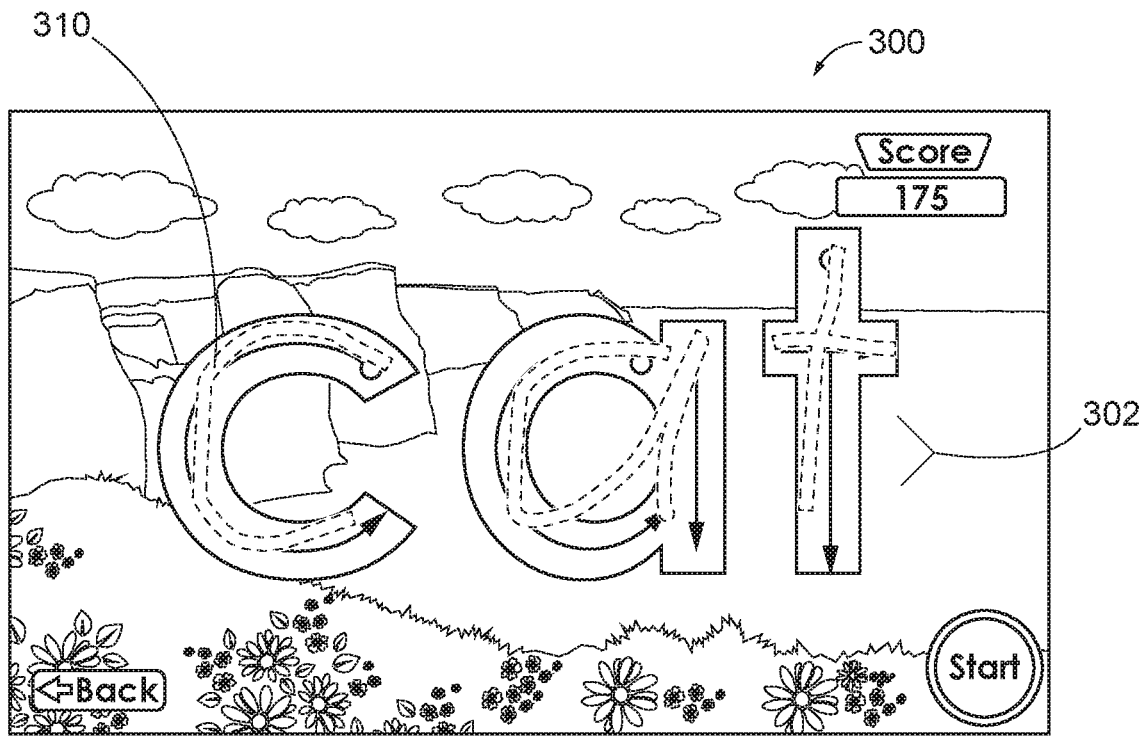

FIGS. 3A and 3B show exemplary screen shots showing a graphical user interface 300 operatively connected to a portable electronic computer device, such as a laptop, touchpad, tablet, smartphone, and the like, configured with the multisensory tutorial software application, according to one embodiment of the present invention. In one embodiment, visual prompts 302 are presented to a user—here, the word "CAT" is presented on the screen of the device. An audio indicator 304 that an audio feature is engaged (the audio feature configured to receive a user's vocal input as a recording of the pronunciation of the word, in order to perform an analysis of speech and speech patterns), as well as an input indicator 306 and an input (slider component) feature 308 (drawing/tracing as directed by the prompt—which is shown in the figure as a prompt for tracing over the letters C-A-T in cat, beginning at the starting point indicated by the "dot", and following the path presented by the arrow). The image shown in FIG. 3A/B is of the type of prompt displayed on the display screen of a portable electronic device configured with the multisensory tutorial program described herein, configured to analyze the written input as well as the spoken input simultaneously, and provide a correction tutorial is a user has a vocal input or tactile input not meeting a threshold value assigned to a target of the prompt.

Shown in FIG. 3B is a continuation of FIG. 3A, specifically an example of user tactile input 310 in response to the prompt presented by the tutorial display 300. The overlay lines represent user tactile input 310 (tracing by touch, for example with a finger, as the user traces the letter on the screen) in response to the prompt to write the word "CAT", which can be carried out while simultaneously speaking the word for an essentially simultaneous collection of both voice recording data and touch patterns that are measured to determine if the tracing aligns with the proper measurements assigned to the target.

Figure 4A:
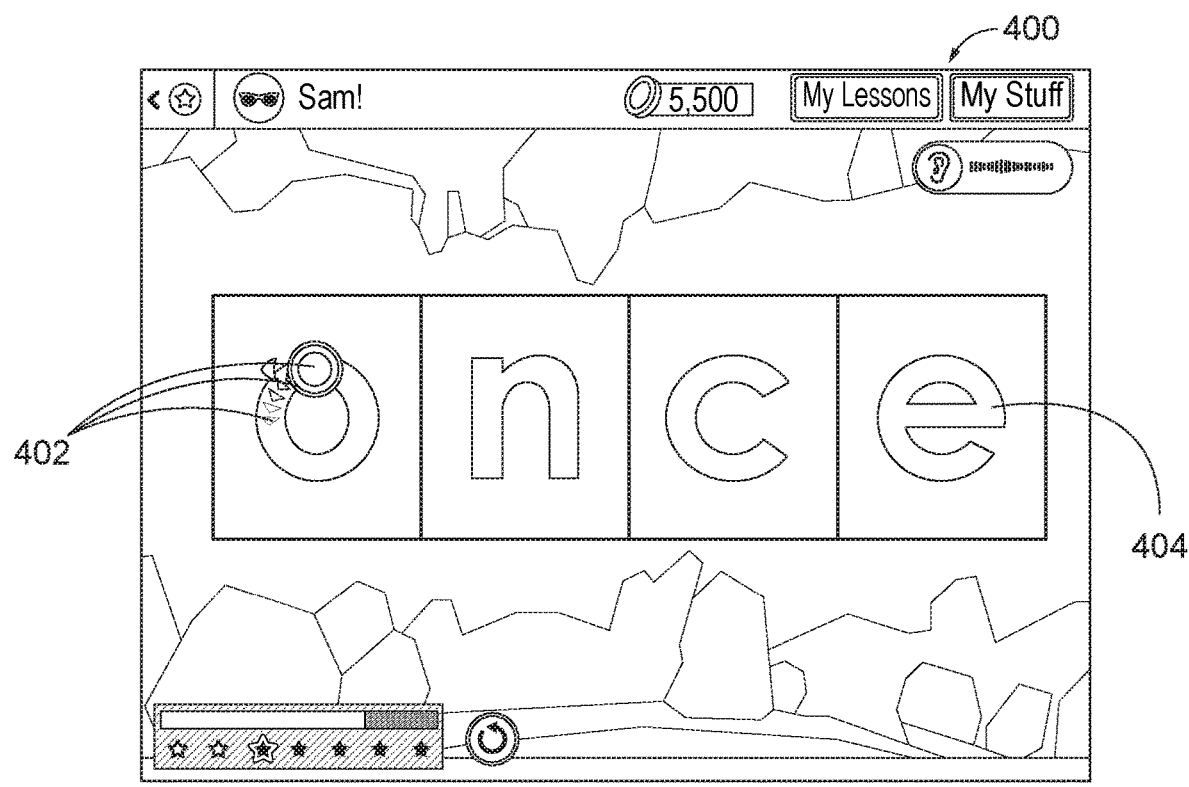
FIG. 4 shows a screen shot of a display on a device configured with a multisensory tutorial module according to one embodiment of the present invention.
Figure 4B:
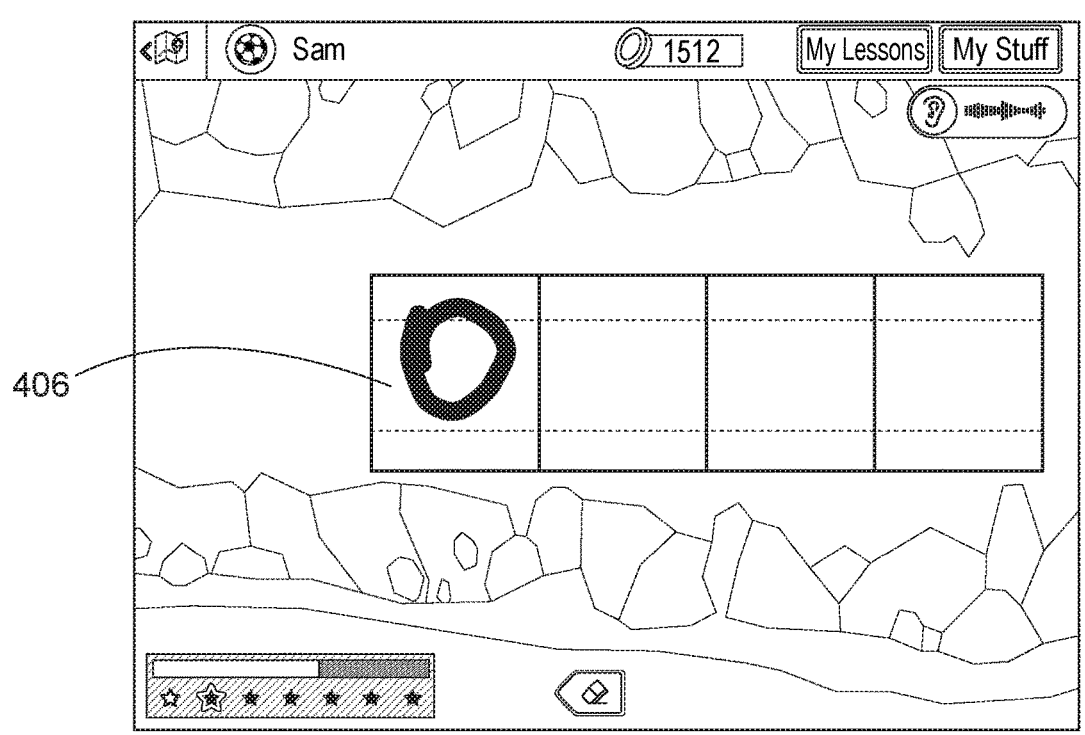

FIGS. 4A and 4B show exemplary screen shots showing a graphical user interface 400 operatively connected to a portable electronic computer device, such as a laptop, touchpad, tablet, smartphone, and the like, configured with the multisensory tutorial software application, according to another embodiment of the present invention. FIG. 4A shows slider component 402 that tracks and measures points related to user input. The tactile input data (stroke points) are measured against the known target 404 (here, shown as the letters "o-n-c-e"). FIG. 4B shows a GUI configured for free-form entry of text, shown here as free-form input 406 referring to input of the letter "O".

Figure 5A:
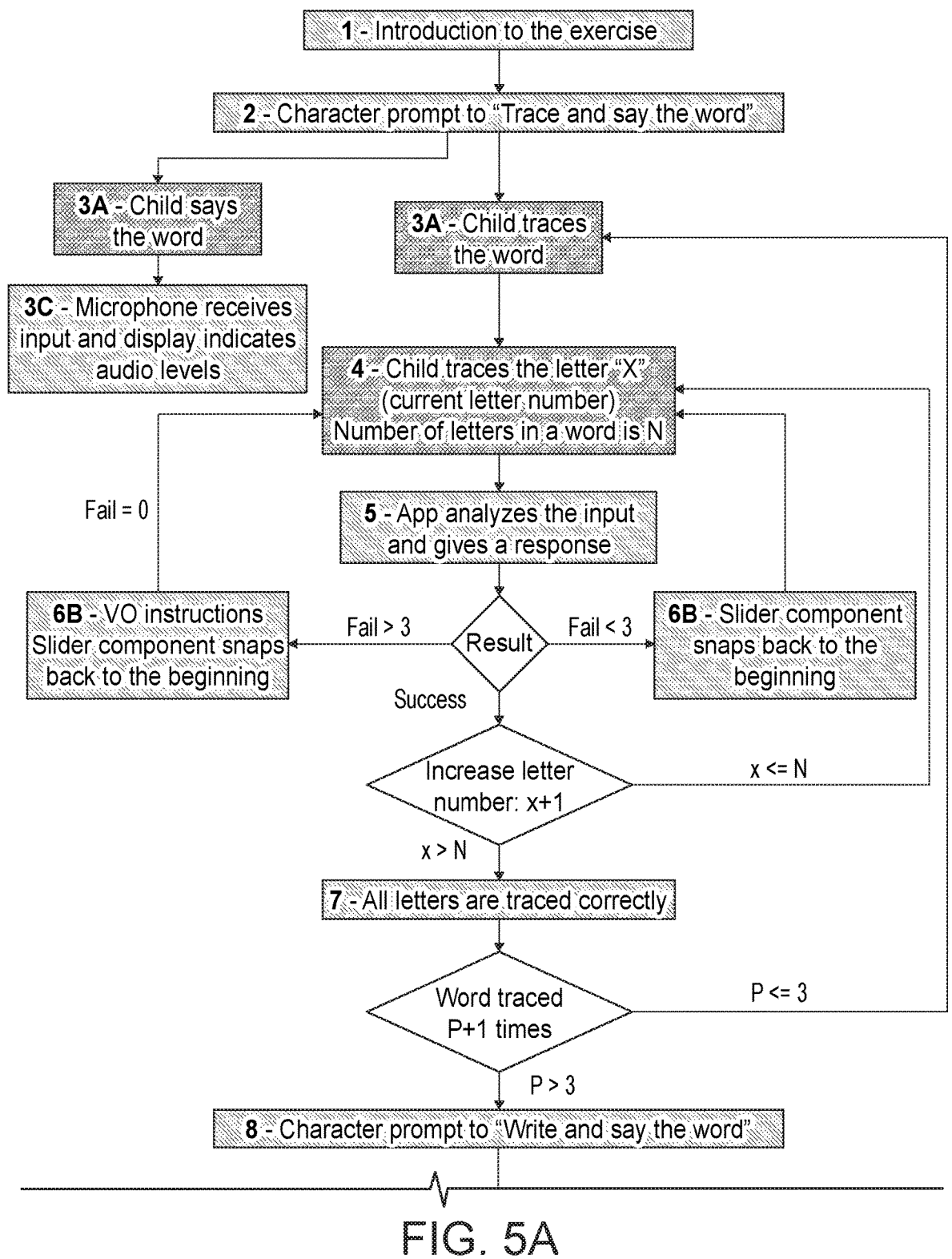
FIG. 5 shows an overview of a method for analyzing both a vocal/phonic input data and tactile input data received simultaneously via a portable electronic device configured with a multisensory tutorial according to one embodiment of the present invention.
Figure 5B:
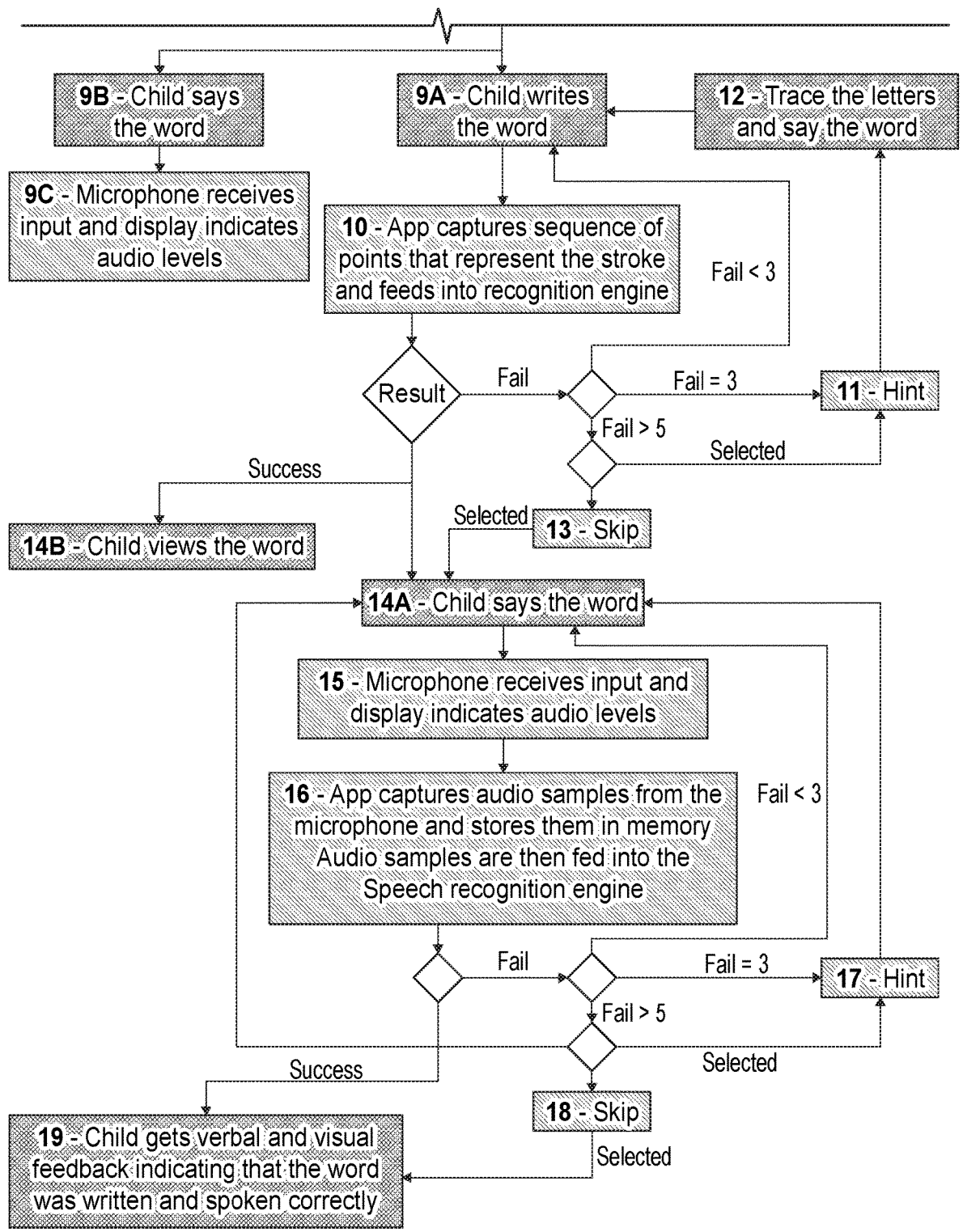

FIGS. 5A and 5B represent a flowchart of one possible implementation of the disclosure, using a graphical user interface operatively connected to any of a variety of computer devices, such as a computer, laptop, touchpad, tablet, mobile phone and the like. In the implementation explained with reference to FIGS. 5A and 5B, the GUI appears on a touchpad capable of receiving tactile input from the user that is input from touching the screen. The steps or processes will be described herein with reference to the numbered elements set out in the flowchart of FIGS. 5A and 5B. It will be appreciated that variations in the sequence and substance of the steps are contemplated, and that this disclosure is not limited to those set out in the figures.

In step 1, suitable programming displays an introductory screen which may instruct the user about the current exercise. In one possible implementation, the introductory screen may portray .a character or other child-friendly indicia to explain one or more exercises to be presented or accessible to the user. The introduction may include aural or visual presentation, alone or in combination.

In step 2, at the end of the introduction, a character or other suitable instructions, prompts, indicia or interface may request the user, i.e., a child or student, to trace and say the word. Sub-steps 3A and 3B relate to receiving input from the user, either serially or in parallel. So, in one possible operation of sub-step 3A, the child uses touch input of the touchpad or other computerized device to provide input related to one or more of the letters appearing on the screen or other interface (as shown in FIGS. 3 and 4). The input provided is "tracing" the letter or other indicia appearing on the screen, such as by following the letter on the screen with a finger, stylus, pointer, mouse, or other indicating device. Suitable program registers the tactile input. In sub-step 3B, the user provides oral input by attempting to pronounce the word that the user has visually perceived on the screen of the device (and which the child may be tracing, have traced, or will trace). Step 3C may also provide suitable indication that the microphone has received or is receiving a suitable level of oral input and may include suitable programming to either indicate a sufficient input, need for adjustment, or self-adjust, and also acts as a "pass/fail" if sufficient input is not detected.

As shown in step 4, tactile input may proceed before, after, or in parallel with oral input of the word, such as, the tactile input involving tracing each of the letters in the word or sound one by one, starting with first letter. In step 5, suitable programming, such as may be in a computer or mobile software application, analyzes the child input, whether tactile or oral, compares it with the expected word, and determines a pass/fail condition from the comparison. For example, if the program is expecting tactile input in the form of a letter "B," but the child traces the letter "D" instead, this is considered as a Fail.

In one suitable implementation, the number of fails is determined by the number or incorrect letter traces. So, in the illustrated implementation in step 6A, in the case of a user tracing less than 3 of the letters incorrectly, the user may be permitted to complete the trace of the letters, but subsequently may be required to repeat the exercise from the beginning for re-enforcement. So, for example, in one suitable graphical interface, suitable programming may display a slider component (See FIGS. 3 and 4), which appears for the first time after such failure (or which reappears at its initial position if it had been displayed previously). In the case of the slider appearing again for a second attempt, the programming may visually cue the user by snapping back to an initial state so that the user may attempt the task again. In other possible scenarios, as in step 6B, once the number of fails exceed 3, suitable visual or audible instructions may be presented to the user to trace the letter again. The foregoing processes may be repeated until the number of letters in the word equals the number of correctly traced letters (that is, all letters traced correctly). If all letters are traced correctly, in step 7, the software application may show a visual confirmation on the device screen, by highlighting all letters.

Suitable programming is provided to receive "free-form" written tactile input without requiring tracing, as described with reference to steps 8-13. The "free-form" written tactile input functionality may be provided as a second tier of learning for the user, as in this illustrated implementation, or may be a separate module or program used independently. (An example of free-form tactile input is shown in FIG. 4B.) In step 8, a graphical user interface displays a character, prompt, or other indicia for the user to write and say the word. Sub-steps may be done in parallel, or wholly or partly sequentially. In step 9A, the child uses suitable tactile input (whether finger, mouse, stylus, pointer, etc.) of the device and draws a letter of a previously observed word from the memory on the screen or other input device. In step 9B, the user says the word that was previously observed, or which is being written out, has been written out, or will be written out. At step 9C the microphone level is evaluated for sufficiency in capturing the oral input of the user.

In one suitable implementation, at step 10, suitable programming captures the tactile input generated by the user and forms a corresponding stroke on the screen by drawing the number of points close enough to each other. This input is stored by the programming or software application as a plurality of coordinates corresponding to the tactile input from the child or other user. The sets of points are stored as a group by strokes or letters, and suitable character recognition programming processes the stored data to recognize the letters, such operations referred to as a pattern or letter recognition engine. If the letter recognition engine does not recognize the expected word, suitable programming logs, records or others presents a failure condition. In this implementation, failure is determined on a word basis rather than a character basis. Similar to the letter tracing module discussed above with reference to steps 1-7, the number of failures and consequences of such failures in terms of repeating of steps or "graduation" to other programming subroutines may be configured in a variety of ways to suit a practitioners goals for users of the program herein. So, in one suitable implementation, if a user fails to write the word, but such failures have been less than 3, in response, programming will "reset" the word by clearing previously input data, such as erasing strokes previously entered in an input area so that the child may attempt the task again. Another possible response to failures is shown in step 11, wherein, if the number of fails equals 3, a graphical, spoken, or other auditory interface may present suitable indicia to assist the user in correctly or accurately writing the word correctly. In one suitable implementation, a graphical user interface presents indicia in the form of a hint button, which, after it appears, the child may press and thereby proceed to step 12.

According to step 12, instead of being prompted to write a word or letter, the user is asked to trace the letter. After the programming detects successful tracing using routines similar to those discussed with reference to steps 3-7), the illustrated process may again present the input options of steps 8-10, in which the user is prompted to write and say the word. In another possible failure scenario, in step 13 if the number of fails is more then 5, suitable programming may present a skip button or other corresponding indicia to enable the user to skip the writing and saying exercises associated with steps 8-12 altogether. In such case, the evaluation may terminate, return to tracing exercises, request the user to say the word rather than write it, try a different word, or otherwise branch to another portion of the exercises or evaluation.

If the input is recognized by the letter or word recognition programming as matching the cued word, that is, if the user successfully writes the word from step 10, then suitable programming (again, whether a phone app, microcode, computer programming, or server-based coding), may provide a visual or audible confirmation of recognition, such as by changing the font, charms, music, and the like. Another portion of programming may run in response to the foregoing successful writing of the word. For example, in sub-steps 14A and 14B, which may proceed in parallel, with each other, the successfully-written word from step 10 is requested to be inputted orally by the user. That is, the programming prompts the user to say the word, which is also the word being displayed for viewing in step 14B.

In step 15, after receiving oral input by the device's microphone, suitable programming confirms appropriate level of audio has been received. Upon such confirmation, in step 16, programming captures the audio of the word spoken by the user, such as by suitable audio sampling received by the microphone. The captured audio and corresponding data is then stored and/or fed into a speech recognition engine. So, at this point in the illustrated process of FIGS. 5A and 5B, one or more words have been traced, written, or spoken, one or more times, and steps 16 is programming suitable for evaluating whether the users spoken pronunciation of the word or words matches the correctly written word. In the event the speech recognition engine detects a word or series of sounds different from the correctly written or cued word, suitably programming may be provided to display or repeat back the incorrect word so as to provide visual or aural feedback to the user to correct the spoken word. So, for example, if the correct word is "once", but the user says "one," then the word "one" is displayed or played back after capture and recognition by the speech recognition engine.

The programming may log the incorrectly spoken word as an error, or "fail." Programming may be provided so that fails below a certain number, such as 3, result in presenting another opportunity to say the word correctly, fails between a threshold and upper limit may initiate written or audible hints so as to improve the user's chance of successfully saying the word correctly on the next oral input, and a third number of fails may result in programming to enable "skipping" the speaking of the word under consideration. (Steps 17 and 18). In step 19, in response to the speech recognition engine detecting successful pronunciation of the work, suitable programming may be executed, such as audible sounds being played or visual indicia being displayed (or both), so that the user feels rewarded or otherwise is apprised of or congratulated for success.

In another embodiment, a multisensory tutorial system comprises a character controller, an audio controller, an environment controller, a camera controller, a UI controller, and an editing mode. In one embodiment, a character controller has settings that list key/value pairs for one or more of a character used in a learning exercise, including but not limited to: Set/Reset sockets (for hand animation for example); list and access characters by key from settings list; head look control (game object/to-camera/to-robot modes); eyes control. In one embodiment, an audio controller uses a configuration containing a list of key/value pairs, wherein key is a string id, and value is an audio clip, but can optionally have a lip-sync data file and a character associated; the audio controller configured to send notification events, including but not limited to: play audio by key; trigger lip-sync for character if any, otherwise notify it with start/stop, audio level average. In one embodiment, an environment controller takes setup scene in its configuration, spawns it and provides interface for modules, including a toggle pieces On/Off; and a query sockets (placeholder-marked positions/transforms) by string id. In one embodiment, a camera controller is configured to manage camera behavior, including a zoom in/out feature. In one embodiment, a UI (user interface) controller is configured to handle UI behavior (interface to shared panels, buttons etc.) and manages transition effects. In one embodiment, a microphone controller manages voice recording, and is configured with its own UI indicator.

In another embodiment, a system editor is provided. The editor is a unity custom editor window designed specifically for the system, and eases access to key components of the application database, enforces constraints and validation layers on data, and allows extending and editing data in lessons.

In one embodiment the editor uses lanes organization. In a default state a color-coded (by themes) list of lessons is presented in leftmost lane (lessons lane, or map). Selecting a lesson in a map lane will reveal a list of exercises used in a lesson with exercise thumbnails, and field for specifying background used in the lesson and any other lesson-specific properties (theme). Exercises in the list are color coded depending on type of exercise, labels present template name. Double-clicking a lesson will launch play mode, with exercise selection for that particular lesson. Hovering over a lesson will show a hint with some details. Selecting an exercise will add a lane for exercise configuration inspector, which permits ability to view modules within the exercise, select a module and see module details. An editing mode allows to add, remove, and reorder items in lessons and exercise lanes. These operations are hidden by default: adding a new lesson will create correctly a named ED_LessonConfig file with no exercises inside, will select a first theme and set a default. Adding a new exercise will create a correctly named ExerciseConfig with no ETS selected.

In one embodiment, the system is configured with a words/graphemes database, in a centralized way to store common things used by mechanics and modules. Data is stored in key-value format. Each word is mapped to: unique vo (different chars), phonemes, chin-bit (with pieces VO). In another embodiment, the system is configured with a player profile database comprising storage of player progress and data (recordings). Each user will have following data stored: name, avatar, random color, grid for identification, settings values (any settings we have in app: like volume, sound on/off etc), FTUE events, list of grids of levels and exercises played, statistics (speed in tests, etc), recordings list and file names, data (serialized to JSON and saved compressed and saved as BASE64 inside a standard system, dubbed PlayerPrefs standard system). In another embodiment, an analytics mode tracks user paths, errors.

The interactive multisensory tutorial system and device is configured to collect and analyze both the spoken word input and written text/tactile input that are collected and received essentially simultaneously via the interactive multisensory tutorial device.

In one embodiment, the user (such as a child) of the multisensory tutorial is directed to trace the letters of a target word displayed on the screen of the tutorial device, tracing the word using a slider component. The user is simultaneously prompted to speak a target word as he/she traces the target word presented on the display of the device. The device's microphone is activated and a visual display of audio input is shown, indicating that vocal input is recorded. As the user traces the target word with the slider component, the input data is collected and stored for analysis. The input is registered and is analyzed by an algorithm comprising a spline path to represent the form of letter. The algorithm measures a distance of deviation that is then compared to a threshold, in turn generating a response by the system. In one embodiment, if the system determines that the user deviates from the target path, the system triggers the slider component to return to a start position and the user can trace the target word or letter again, from a beginning position. The tutorial transitions to a next level once all target words or letter from the level have been successfully completed and have met the requirements of the target path.

In one embodiment, a user of the multisensory tutorial is directed to draw/write letters via the touchscreen of the device corresponding to a target word. The system captures a sequence of points that represent the stroke of the letter formation which is then fed into a pattern recognition engine that may be configured as local using processing power of the device. Following processing by the pattern recognition engine, the system calculates a response that represents an error, or n-best results (the probability that the input is recognized or not recognized). Alternatively, the system is configured with a recognition engine that is cloud based, and sends a REST request, and then receive a response that represents an error or n-best results. The responses of the recognition engine are compared to expected target letter scores; if it is determined that the response does not match the expected target results (or meets a certain probability threshold) then the system causes the incorrect letter to be highlighted and displayed on the screen of the device, optionally the system causes an icon to be presented that indicates an incorrect letter has been drawn; and the system causes an audio cue to be given via the device that indicates an incorrect letter or letters in the word, and the user is then directed to try again. Once the system determines that all letters presented in a word on the screen of the device are written correctly, the tutorial transitions to the next step.

In one embodiment, a user of the multisensory tutorial is directed to say a target word while viewing the target word presented on the display of the tutorial device. Audio samples are collected via the microphone of the device and audio data is stored in memory. The audio data is then fed into a speech recognition engine that is either local to the device or cloud based. A recognition response score is calculated and the responses from the recognition engine are compared to the expected target word.

If the actual response does not match the expected target word (or phrase) then the system presents an icon on the display of the device to indicate an incorrect audio response; and the system presents a verbal cue to indicate an incorrect audio response. If the tutorial determines that the response is incorrect, then the system presents the user with a correct verbal and written model of the word by animation of the written word, and by audio of the spoken word. The system then directs the user to initiate the task from the beginning. Once the system determines that the task was accomplished correctly, the tutorial transitions to the next step.

It will be appreciated that when this disclosure references "and" in conjunction with a child-user's interactions with the system, such as in the step "trace and say," the meaning of "and" shall include both conjunctive and disjunctive situations, so that the child may perform either or both of such actions, and they may be performed either in parallel or in series. It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, steps, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The reader's attention is directed to all papers and documents which are filed concurrently with or previous to this specification in connection with this application and which are open to public inspection with this specification, and the contents of all such papers and documents are incorporated herein by reference.

The invention claimed is:

1. A method, comprising:
presenting, via a portable electronic device, a prompt to a user, wherein the prompt comprises a visual command shown on a touchscreen display of the portable electronic device, the visual command instructing the user to trace a plurality of letters forming a word and an oral command associated with the visual command output by at least one speaker of the portable electronic device instructing the user to simultaneously speak the word;
detecting via the touchscreen display at least one tactile input responsive to the visual command and/or the oral command;
activating a microphone of the portable electronic device to record audio sample(s) spoken by the user occurring simultaneously with the at least one tactile input and monitoring the audio sample(s) to detect at least one phonic input, wherein the at least one phonic input comprises a spoken word from the user, and wherein the at least one tactile input comprises a tracing of the plurality of letters of the visual command, thereby generating a recording of input data comprising the at least one phonic input and the at least one tactile input;
analyzing, via a speech recognition engine the at least one phonic input and via a pattern recognition engine the at least one tactile input collected from the user to determine a success or failure for the visual command and the oral command;
providing on the touchscreen display a visual confirmation to the user that the plurality of letters were traced correctly and the word was spoken correctly when the analyzing determines success for the visual command and the oral command;
determining a total number of prior unsuccessful phonic inputs and/or tactile inputs for the prompt when the analyzing determines failure of the visual command and the oral command;
when the determined total number of prior unsuccessful phonic inputs and/or tactile inputs is less than a pre-determined number, providing to the user a visual cue indicating to the user to again trace the plurality of letters and speak the word;
when the determined total number of prior unsuccessful phonic inputs and/or tactile inputs is greater than or equal to the predetermined number, providing, via the portable electronic device, a visual and/or audio instruction to the user about how to perform the tactile and/or phonic input, and then instructing the user to again trace the plurality of letters and speak the word;
following providing the visual confirmation to the user that the plurality of letters were traced correctly and the word was spoken correctly, presenting, via the portable electronic device, a second prompt to the user, wherein the second prompt comprises a second visual command shown on the touchscreen display of the portable electronic device, the second visual command instructing the user to write a plurality of letters forming a new word and a second oral command associated with the visual command output by the at least one speaker of the portable electronic device instructing the user to simultaneously speak the new word;
detecting via the touchscreen display at least one second tactile input responsive to the second visual command and/or the second oral command;
activating the microphone of the portable electronic device to record audio sample(s) spoken by the user occurring simultaneously with the at least one second tactile input and monitoring the audio sample(s) to detect at least one second phonic input, wherein the at least one second phonic input comprises a spoken word from the user, and wherein the at least one second tactile input comprises free-form writing of the plurality of letters of the second visual command in blank spaces on the touchscreen display, thereby generating a recording of input data comprising the at least one second phonic input and the at least one second tactile input;
analyzing, via the speech recognition engine, the at least one second phonic input and via the pattern recognition engine the at least one second tactile input collected from the user to determine a success or failure for the second visual command and the second oral command; and
providing on the touchscreen display a second visual confirmation to the user that the plurality of letters of the second visual command were written correctly and the new word was spoken correctly when the analyzing determines success for the second visual command and the second oral command.

2. The method of claim 1, wherein the analyzing is carried out by an algorithm comprising a spline path, to represent the form of the at least one letter of the plurality of letters, that measures a distance of deviation compared to a threshold value.

3. The method of claim 1, wherein monitoring the audio sample(s) to detect the at least one phonic input comprises determining whether the recorded audio sample(s) are sufficient for speech recognition analysis, and providing an indication to the user to self-adjust speech when the audio sample(s) are determined to be insufficient for speech recognition analysis.

4. The method of claim 1, wherein the visual command shown on the touchscreen display instructing the user to trace the plurality of letters comprises an outline of each letter of the plurality of letters, and wherein the at least one tactile input comprises a tracing for each letter provided via the touchscreen display.

5. The method of claim 1, wherein the visual command instructing the user to trace the plurality of letters presented on the touchscreen display comprises a slider and a tracing path representative of each letter of the plurality of letters, and wherein the at least one tactile input comprises manipulating the touchscreen display to move the slider along the tracing path for each letter.

6. The method of claim 5, wherein the visual cue indicating to the user to again trace the plurality of letters comprises returning the slider to an initial position of the tracing path of each letter.

7. The method of claim 1, further comprising displaying an audio indicator on the touchscreen display when the microphone is activated and audio sample(s) are being collected.

8. The method of claim 1, wherein analyzing the at least one tactile input and the at least one phonic input comprises comparing the at least one tactile input and the at least one phonic input to data for target tactile and phonic inputs for the prompt stored on a computer database.

9. The method of claim 1, wherein when the predetermined number of prior unsuccessful phonic inputs and/or tactile inputs is three or more.

10. The method of claim 1, wherein the visual or audio instruction provided when the determined total number of prior unsuccessful phonic inputs and/or tactile inputs is greater than or equal to the predetermined number comprises presenting a multisensory tutorial providing instructions for proper pronunciation and proper text formation for the plurality of letters of the visual command.

11. The method of claim 1, wherein the visual or audio instruction provided when the determined total number of prior unsuccessful phonic inputs and/or tactile inputs is greater than or equal to the predetermined number comprises an instruction modeling a correct pronunciation, to show the user differences between the words or sounds spoken by the user and the word.

12. The method of claim 1, wherein the visual command shown on the touchscreen display comprises displaying a visual model comprising animation modeling proper text formation for the plurality of letters forming the word.

13. The method of claim 1, wherein the at least one tactile input detected by the touchscreen display is provided by the user pressing a finger against the touchscreen display and moving the finger to form the plurality of letters.

14. The method of claim 1, further comprising:
determining a total number of prior unsuccessful phonic inputs and/or tactile inputs for the second prompt when the analyzing determines failure of the second visual command and the second oral command;
when the determined total number of prior unsuccessful phonic inputs and/or tactile inputs for the second prompt is less than a predetermined number, clearing any markings entered by the user from the blank spaces of the touchscreen display and providing to the user a visual cue indicating to the user to again write the plurality of letters of the second visual command in the blank spaces on the touchscreen and speak the word; and
when the determined total number of prior unsuccessful phonic inputs and/or tactile inputs for the second prompt is greater than or equal to the predetermined number, providing a visual and/or audio instruction to the user about how to perform the tactile and/or phonic input, and then providing a visual indication on the touchscreen display instructing the user to trace the plurality of letters of the second visual command on the touchscreen display and to speak the new word.

15. The method of claim 14, further comprising, after providing on the touchscreen display the second visual confirmation to the user that the plurality of letters of the second visual command were written correctly and the new word was spoken correctly, presenting, via the portable electronic device, a third prompt to the user, wherein the third prompt comprises a third visual command shown on the touchscreen display of the portable electronic device, the third visual command instructing the user to read aloud another new word displayed on the touchscreen display.

16. The method of claim 15, further comprising:
activating the microphone of the portable electronic device to record audio sample(s) spoken by the user;
monitoring the audio sample(s) to detect at least one third phonic input, wherein the at least one third phonic input comprises a spoken word from the user; and
analyzing, via the speech recognition engine, the at least one third phonic input to determine success when the user reads aloud the another new word correctly or failure when the user failed to correctly read aloud the another new word.

17. The method of claim 16, further comprising:
providing on the touchscreen display a visual confirmation to the user of successful completion of the third prompt when the analyzing determines that the user successfully read aloud the another new word correctly;
determining a total number of prior unsuccessful phonic inputs for the third prompt when the analyzing determines failure of the third visual command;
when the determined total number of prior unsuccessful phonic inputs for the third prompt is less than a predetermined number, providing the third visual command again instructing the user to read the another new word; and
when the determined total number of prior unsuccessful phonic inputs for the third prompt is greater than or equal to the predetermined number, providing a visual and/or audio hint to the user to improve the user's chance of successfully saying the another new word correctly on a subsequent oral input.

18. The method of claim 17, further comprising, when the determined total number of prior unsuccessful phonic inputs for the third prompt is greater than a second predetermined number, displaying on the touchscreen of the portable electronic device a skip indicia that allows the user to skip speaking the another new word of the third prompt.

* * * * *